April 13, 1954  C. H. CRAWLEY  2,674,786
METHOD OF MAKING FITTINGS
Filed Jan. 20, 1951
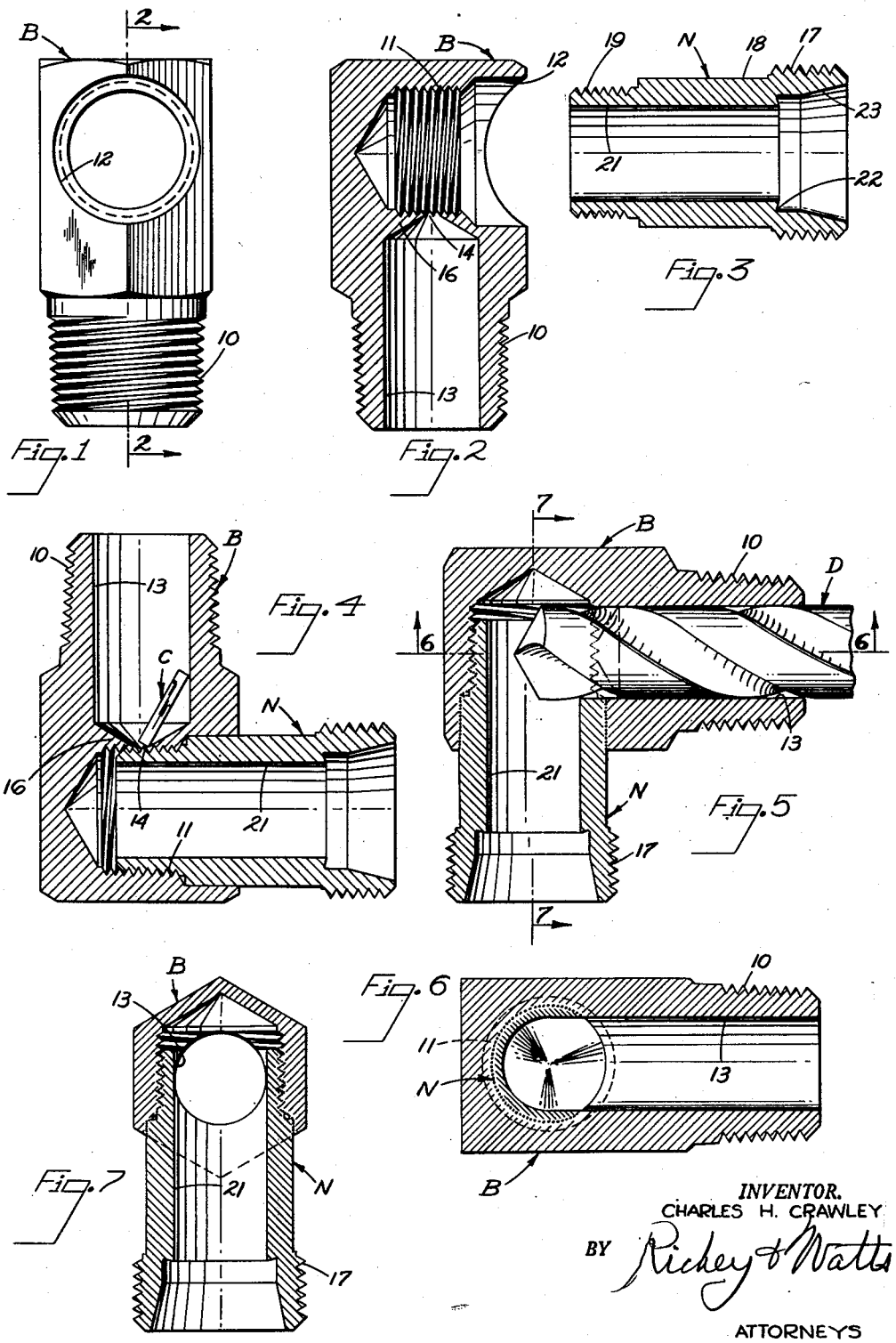
INVENTOR.
CHARLES H. CRAWLEY
BY Richey & Watts
ATTORNEYS Patented Apr. 13, 1954

2,674,786

UNITED STATES PATENT OFFICE 2,674,786

METHOD OF MAKING FITTINGS

Charles H. Crawley, Euclid, Ohio, assignor to The Weatherhead Company, Cleveland, Ohio, a corporation of Ohio Application January 20, 1951, Serial No. 207,002

3 Claims. (Cl. 29—157)

This invention relates to fittings, and more particularly is concerned with new and useful improvements in angle fittings and methods of making such fittings. Fittings are currently sold in the trade, which will be referred to as angle fittings, for joining the ends of tubes or pipes at an angle to one another.

The economical production of relatively small tube or pipe fittings has presented some difficulty, particularly where high pressures are about to be encountered in service. Accordingly it has been common practice to make these fittings in one piece, as by machining from solid stock or by machining forgings or the like in order that the requisite resistance to high bursting pressures will be obtained. It has long been recognized that in some instances the most economical way to produce angle fittings is by the assembly of separately machined parts, such as screw machine parts, coupled with a welding or brazing operation to join these parts together. However, prior fittings embodying this construction have not been as strong as the more expensive forged-type fittings.

A principal object of the invention, therefore, resides in the economical production of brazed fittings having, even in the smaller sizes, the same strength and resistance to bursting pressures as a one-piece fitting. The preferred form of the invention will be described in connection with producing an angle or elbow-type fitting. This is accomplished by providing a threaded counterbore in a fitting body member and an intersecting counterbore in said member, preferably having a conical end wall, formed by the end of a conventional twist drill. A nipple is threadedly fitted into the counterbore with the threads of the nipple exposed through the intersection of said counterbore. Brazing material is then introduced to the threads on the nipple exposed at the intersection and the fitting passed through the usual hydrogen atmosphere brazing furnace, whereupon the brazing material, such as copper or the like, flows circumferentially and axially in both directions around the threaded joint. With this construction there is no interruption of the threaded joint to act as a dam or to prevent the capillary action taking place that causes the brazing material to flash in all directions and completely between the threads.

The fitting is completed by running a drill or similar cutting tool through the intersecting counterbore and removing the material of the nipple wall adjacent said intersection. A completed fitting has the advantages, insofar as strength is concerned, of both the threaded and brazed-type joint, and yet due to the aforesaid method of forming the fitting the brazing material is completely disposed between all of the remaining threaded areas.

The manner in which these and other objects may be accomplished will be apparent from the following detailed description of a preferred embodiment of the invention.

In the drawings:

Fig. 1 is a front elevation of a fitting body member;

Fig. 2 is a section through the member taken on 2—2 of Fig. 1;

Fig. 3 is a section through the tubular or nipple member;

Fig. 4 shows the members assembled ready for brazing;

Fig. 5 shows the drilling operation that completes the fitting; and,

Figs. 6 and 7 are sections taken on 6—6 and 7—7, respectively of Fig. 5.

The fitting body B has a threaded nipple 10 for connection to a fluid pressure fitting or line, a threaded counterbore 11 extending at an angle of said nipple and having an enlarged cylindrical bore emerging therewith shown at 12. The nipple 10 is drilled as at 13 to such a depth that the point of the drill intersects the threads 11 as at 14 to provide a small area opening, thereby leaving thin-section end wall material 16 which will later be removed.

The tubular member or nipple N is externally threaded as at 17 for reception of a fitting nut. The nipple has a cylindrical shank 18, and a threaded end part 19 machined to provide straight threads or machine-screw type for mating with the threaded counterbore 11. The nipple has a through passageway 21 and in the form shown is provided with an inverse conical seat 22 and a tapered wall 23 for making fluid connection with a copper or other type of tube. The body and nipple parts are preferably machined from bar stock in automatic lathes or screw machines, body B being formable from hexagonal stock and nipple N being formable from round bar stock or from tubing.

The nipple N and the body B are threaded together (as seen in Fig. 4) and the fitting inverted so that a slug of brazing material, which may be a length of copper wire C, may be positioned in threaded counterbore 13 ready to flow around the threads through the intersection or access opening 14. The fitting is heated to brazing temperature in any suitable manner. For example it may be passed through a continuous conveyor-type hydrogen atmosphere brazing furnace, preferably while disposed in the upright position as shown in Fig. 4. The copper brazing material C melts, and due to the capillary action between the threaded parts flashes or flows circumferentially and axially in both directions, finding its way between the parts so that a perfect bond is formed betwen the threaded portions of the body and the tubular member. The relatively small diameter of the intersection 14 of the counterbores, coupled with the fact that the brazing material is introduced at the middle of the area to be brazed, insures that there will be nothing to interfere with the capillary flow of brazing material in the joint.

After completion of the brazing process a cutting tool, such as a drill D, is applied through the counterbore 13 in the body and removes the portions 16 at the intersection of the counterbores as well as a portion of the wall of the tubular member, thereby forming an angular fluid passageway through the completed fitting. The completed fitting has the combined structural advantages of both the threaded and bonded joints, and even though a portion of the wall of the tubular member is removed for fluid communication, this is not done to the detriment of the brazed joint. Although the wall sections are quite thin, particularly where the fittings are of a small dimension, due to the method of making the fitting the completed unit is as strong as a forged device or one machined from the solid. The completed fitting has a threaded shank on the nipple that extends well into the body of the fitting, past and across the intersecting bore, and even though this shank portion is interrupted by the bore, it is, in its uninterrupted portion, perfectly bonded or brazed to the body part.

A fitting made in accordance with the invention is cheaper to produce than prior one-piece fittings, and is stronger than prior composite fittings. A fitting made in accordance with the invention, therefore, combines the advantages of the one-piece and the composite fittings without being subject to the disadvantages, in terms of cost of manufacture and strength of the completed unit, heretofore characteristic of prior devices.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. The method of fabricating a fitting comprising the steps of forming a fitting body having a threaded counterbore therein intersected intermediate the axial extent of the threads by another counterbore, threading a tubular threaded member into said threaded counterbore with said threads extending across said intersection, placing a slug of brazing material in said other counterbore against the threads on said tubular member, passing said assembly through a brazing furnace causing molten brazing material to flow circumferentially and axially in both directions from said intersection along said threads, and running a cutting tool through said other counterbore to remove metal from said body and the threaded part of said tubular member to form an angular fluid passageway through said fitting.

2. The method of fabricating a fitting comprising the steps of forming a fitting body having a threaded counterbore therein intersected intermediate the axial extent of the threads by the conical bottom wall of another counterbore, threading a tubular threaded member into said threaded counterbore with said threads extending across said intersection, placing a slug of brazing material in said other counterbore against the threads on said tubular member, passing said assembly through a brazing furnace causing molten brazing material to flow circumferentially and axially in both directions from said intersection along said threads, and running a cutting tool through said other counterbore to remove metal from said body and the threaded part of said tubular member to form an angular fluid passageway through said fitting.

3. A method of fabricating a fitting comprising the steps of forming a fitting body having a first counterbore therein intersected by a second counterbore spaced from the ends of said first counterbore, inserting a tubular member into said first counterbore with the end thereof extending across said intersection, placing a slug of brazing material in said second counterbore against the circumference of said tubular member, passing the assembly through a brazing furnace causing molten brazing material to flow circumferentially and axially in both directions from said intersection along said tubular member, and running a cutting tool through said second counterbore to remove the material from said body and from said tubular member adjacent to said second counterbore to form an annular fluid passage through said fitting.

References Cited in the file of this patent

UNITED STATES PATENTS

| Number | Name | Date |
|---|---|---|
| 257,983 | Scofield | May 16, 1882 |
| 326,469 | Youngs | Sept. 15, 1885 |
| 1,868,037 | Weatherhead | July 19, 1932 |
| 2,084,207 | Lindquist et al. | June 15, 1937 |
| 2,152,102 | Stecher | Mar. 28, 1939 |
| 2,528,280 | Lyon | Oct. 31, 1950 |